Aug. 8, 1933.  F. L. KARLSON  1,921,755
MIRROR
Filed July 18, 1932  2 Sheets-Sheet 1

Inventor
F. L. Karlson
By Clarence A. O'Brien
Attorney

Aug. 8, 1933.  F. L. KARLSON  1,921,755
MIRROR
Filed July 18, 1932   2 Sheets-Sheet 2

Inventor
F. L. Karlson
By Clarence A. O'Brien
Attorney

Patented Aug. 8, 1933

1,921,755

UNITED STATES PATENT OFFICE 1,921,755

MIRROR

Frithiof L. Karlson, Liberty, N. Y.

Application July 18, 1932. Serial No. 623,270

3 Claims. (Cl. 45—97)

The present invention relates to new and useful improvements in mirrors for various uses on automobiles in particular, and has for its primary object to provide, in a manner as hereinafter set forth, a mirror of this character embodying a novel construction, combination and arrangement of parts through the medium of which said mirror may be expeditiously and adjustably mounted in position for use on any substantially smooth surface of the automobile, such as on the windshield, windows, etc.

Other objects of the invention are to provide a mirror of the aforementioned character which will be simple in construction, strong, durable, highly efficient and reliable in use, attractive in appearance, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 7:
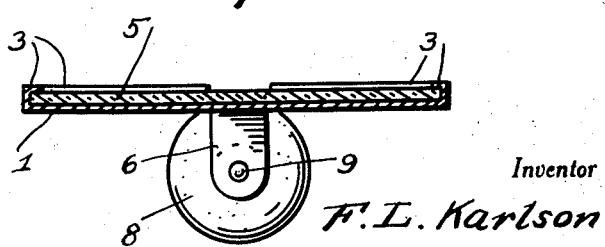
Figure 7 is a view in vertical section, taken substantially on the line 7—7 of Figure 2, looking in the direction indicated by the arrows.

Referring now to the drawings in detail, it will be seen that the embodiment of the present invention which has been illustrated comprises a substantially rectangular metallic plate 1 having its corner portions cut, as at 2, to provide a plurality of marginal flanges 3 which are folded on the broken lines 4 for securing a reflecting glass 5 in position on said metallic plate 1. This is illustrated to advantage in Figures 3, 4 and 7 of the drawings.

Also formed integrally with the metallic plate 1 between spaced flanges on one side of said plate is a bendable arm 6 having an opening 7 in its free end portion. The reference numeral 8 designates a rubber suction cup having fixed centrally thereon a pin 9 which is anchored in the opening 7 for mounting said suction cup on the free end portion of the bendable arm 6.

Figure 1:
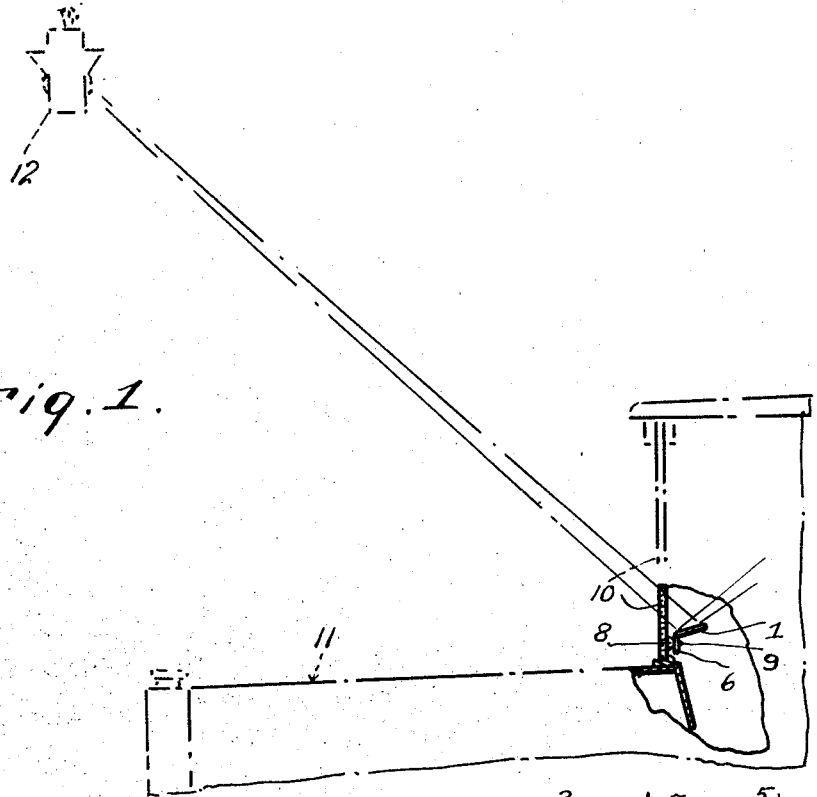
Figure 1 is a view in side elevation, showing a mirror constructed in accordance with the present invention mounted in position on the lower portion of the inner side of an automobile windshield for use in observing an overhead traffic light.
Figure 2:
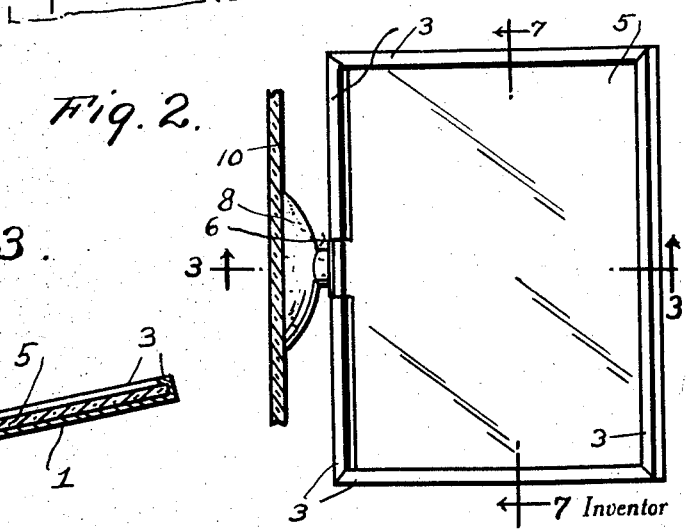
Figure 2 is a view in top plan of the mirror.
Figure 3:
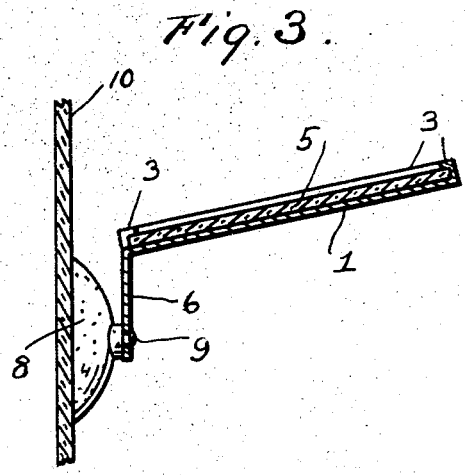
Figure 3 is a view in vertical transverse section, taken substantially on the line 3—3 of Figure 2.
Figure 4:
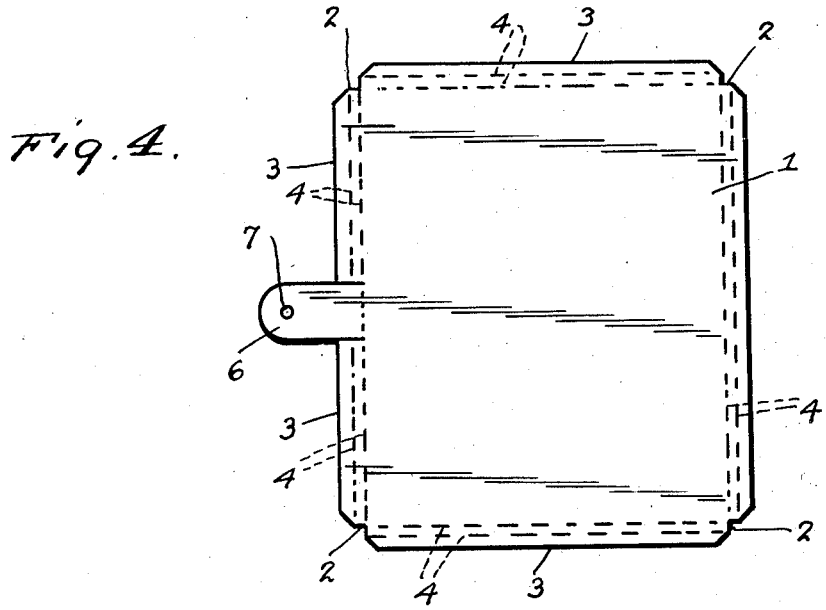
Figure 4 is a detail plan view of the blank from which the metal portion of the device is formed.
Figure 5:
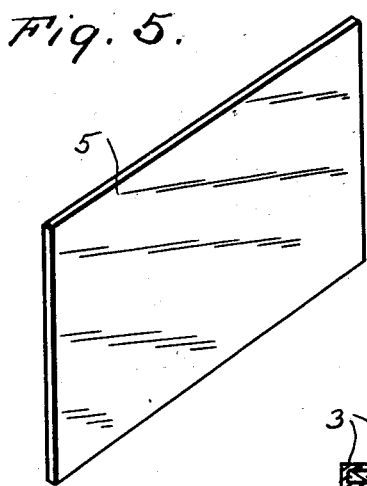
Figure 5 is a detail view in perspective of the glass.
Figure 6:
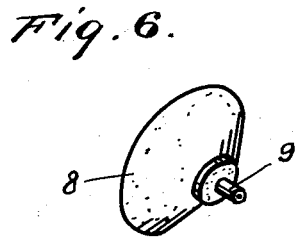
Figure 6 is a detail view in perspective of the suction or vacuum cup.

In use, the suction cup 8 is operatively engaged with any substantially smooth surface on the automobile, such as on the windshield 10 at the desired location. Then, through the medium of the bendable arm 6, the reflecting glass 5 may be conveniently adjusted to any desired angle, such as is illustrated in Figures 1 and 3 of the drawings. The construction provided is such that substantially all of the metallic portions of the device may be struck or formed from a single piece of sheet metal. The device may be used for observing overhead traffic signals, as illustrated, as a rear view mirror when mounted and properly adjusted on the upper portion of the automobile windshield, on the windows of the automobile for observing other vehicles immediately to the left rear, which are about to pass and for any other purposes for which the device may be found adapted or desirable. In Figure 1 of the drawings, a portion of the vehicle is designated by the reference numeral 11 and an overhead traffic signal is indicated at 12.

It is believed that the many advantages of a mirror constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:

1. A mirror comprising a substantially rectangular, flat, metallic plate, a reflecting glass mounted on the plate, flanges integral with each of the four marginal flanges of the metallic plate and engaged over the glass for securing said glass in position on the plate, one side of the plate having a pair of spaced flanges thereon, a bendable arm formed integrally with the plate between the spaced flanges, and a suction cup mounted on the free end portion of the bendable arm for engagement with a support.

2. A mirror comprising a substantially rectangular, flat, metallic plate, a substantially rectangular reflecting glass mounted on one side of the metallic plate, flanges integral with each of the four marginal edges of the metallic plate engaged over the glass for securing said glass in position on the metallic plate, one of the edges of the metallic plate having a pair of spaced flanges thereon, a bendable arm formed integrally with said one edge of the metallic plate between the spaced flanges, said arm having an opening in its free end portion, a suction cup, and a pin projecting from the suction cup and anchored in the opening for mounting said suction cup on the arm.

3. A blank comprising a flat, metallic plate of substantially rectangular plan having substantially diagonal corner portions providing flanges on each of the four edges of the plate, said plate having a pair of spaced flanges on one edge thereof, an arm extending from said one edge of the plate between the spaced flanges, said arm having an opening in its free end portion.

FRITHIOF L. KARLSON.